No. 832,917. PATENTED OCT. 9, 1906.
G. A. MACBETH.
COLORED SIGNAL LENS.
APPLICATION FILED FEB. 26, 1906.
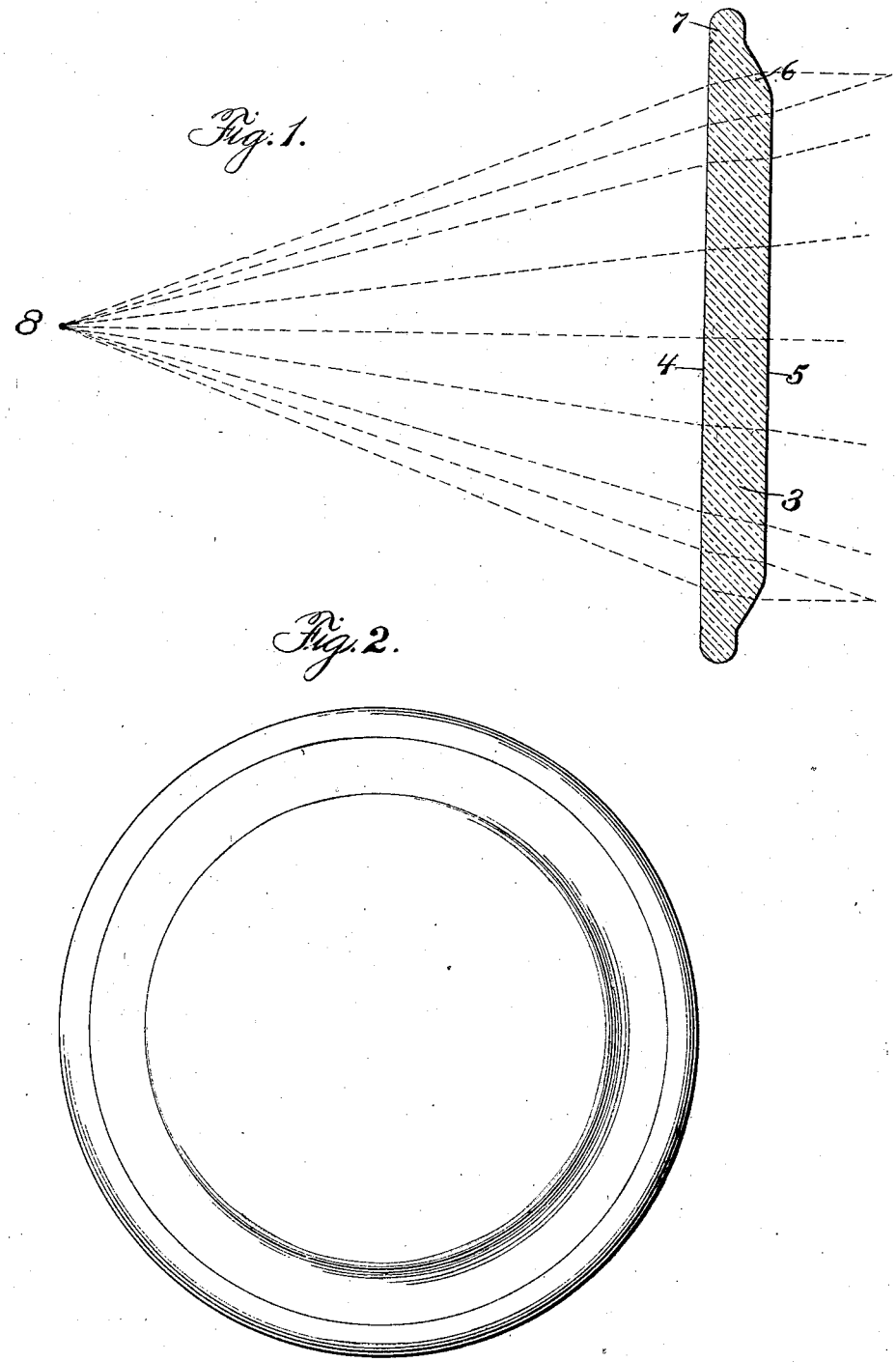
WITNESSES
INVENTOR

UNITED STATES PATENT OFFICE.

GEORGE A. MACBETH, OF PITTSBURG, PENNSYLVANIA.

COLORED SIGNAL-LENS.

No. 832,917. Specification of Letters Patent. Patented Oct. 9, 1906.

Application filed February 26, 1906. Serial No. 302,930.

*To all whom it may concern:*

Be it known that I, GEORGE A. MACBETH, a citizen of the United States, residing at Pittsburg, in the county of Allegheny and State of Pennsylvania, have invented certain new and useful Improvements in Colored Signal-Lenses, of which the following is a specification.

The invention relates to colored signal lenses, and has for its objects; to provide a colored lens with transmission properties substantially uniform throughout the lens so that the color indicated thereby is substantially the same at all points on the surface of the lens; to provide a lens which will transmit a maximum amount of light; to provide a lens which when inclined by inaccuracy of placement or accident will show a light in the desired direction, and to provide a lens of inexpensive construction that may be readily cleaned and which has no crevices to collect and hold dirt. One form of the invention is illustrated in the accompanying drawings, in which—

Figure 1 is a transverse section through the center of the lens, and showing the center of illumination and light rays indicated by dotted line, and Figure 2 is a front view of the lens.

The lens is intended primarily for switches and other short distance signals employing colored glass and in which a lens of high power is not necessary or desirable. Lenses of this class heretofore have either been made solid with a flat back and convex face, or else have been of the well known convex-concave type provided with the annular offsets or corrugations for securing parallelism of rays. Lenses of the first class have been found objectionable because of the great thickness of the glass at the center, especially in certain colors which cut down the amount of light in such a way as to seriously impair the efficiency of the lens and also made the color of the light vary in darkness from the center out, while lenses of the second class, although free from the above objection, have been found undesirable because of the tendency of the grooves or corrugations to collect and hold dirt, thereby dimming the light and because of the difficulty in cleaning the grooves. I have found that both of these objections in colored lenses may be avoided by my construction in which I provide a substantially flat lens with convexed edges for bringing into parallelism the extremely divergent rays.

As shown in the drawing, 3 is the lens having the substantially flat parallel back and front faces 4 and 5 respectively, and being provided at the edges with the convex portion 6. The outer edge of the lens is provided with a portion 7 by which the lens is secured in its casing. 8 is a source of light diverging from which are the rays of light, as indicated by dotted lines. Those rays of light which strike the flat portion of the lens it will be noted continue diverging after passing the lens, while the extremely diverging rays striking the portion of the lens provided with the curve 6 are refracted and brought into parallelism. It will therefore be apparent that the lens is intended for short distance work, the primary idea being to secure an illumination of the colored glass. The glass is made of sufficient thinness so that the rays of light will not be unduly retarded and the efficiency thereby impaired. By making the lens in this way a light-giving surface of uniform color is secured, and further the flat surfaces are very desirable for the practical consideration of cleaning, as such surfaces are not only easily cleaned, but do not collect and hold dirt as do the ordinary corrugated lenses. This lens is also very desirable on a switch stand because of the fact that such stands are apt to be inaccurately placed and also liable to accidental displacement so that in many cases the lamp does not exactly face in the direction desired. In some cases the light will be improperly inclined up or down and in other cases will be laterally inclined. Under such conditions my lens is desirable for the reason that because of the divergency of the rays the lamp when viewed from the oblique direction will always show considerable light, and in case of the inaccuracies or accidents above referred to occasioning a twisting of the lamp it will not be incapacitated to the extent that the ordinary plano-convex lens or convex lens or concave-convex corrugated lens is. It will also be apparent that the lens is of a construction rendering it easily and inexpensively made, and that no great accuracy is necessary in its production. Other advantages will be apparent to those skilled in the art.

Having thus described my invention and illustrated its use, what I claim as new, and desire to secure by Letters Patent, is the following:

A colored signal lens having a flat back, and a flat face substantially parallel to such back and provided with convexly curved lenticular edges, whereby the central portion of the lens is adapted to transmit the rays of light in their original direction while the edges thereof refract the rays into parallelism.

In testimony whereof I have hereunto signed my name in the presence of the two subscribed witnesses.

GEO. A. MACBETH.

Witnesses:
F. E. GAITHER,
ARCHWORTH MARTIN.